Jan. 11, 1927.
L. THIEL
LATHE
Filed Sept. 22, 1924
1,614,049
3 Sheets-Sheet 2
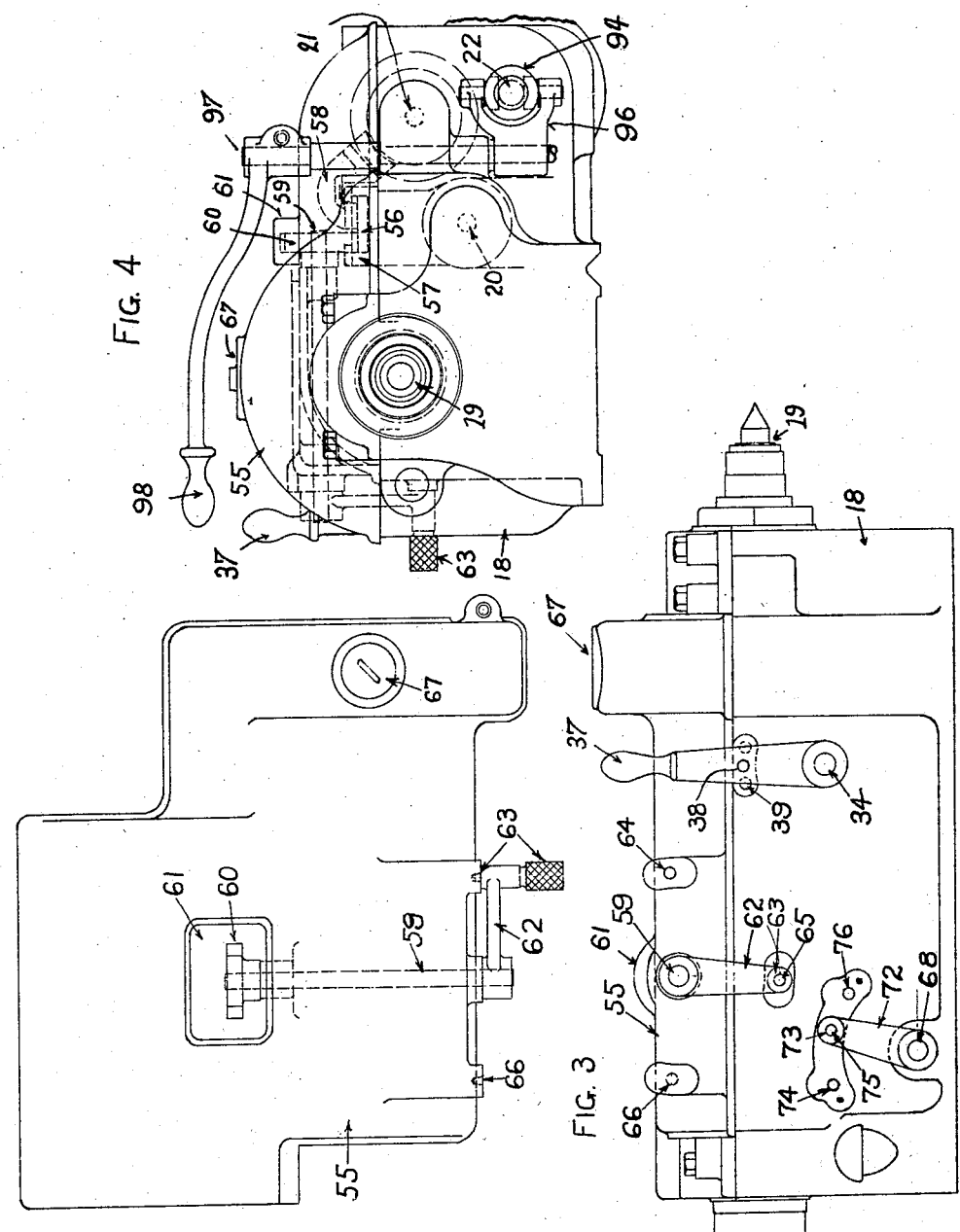
INVENTOR.
Louis Thiel
BY
C. W. Miller,
ATTORNEY.

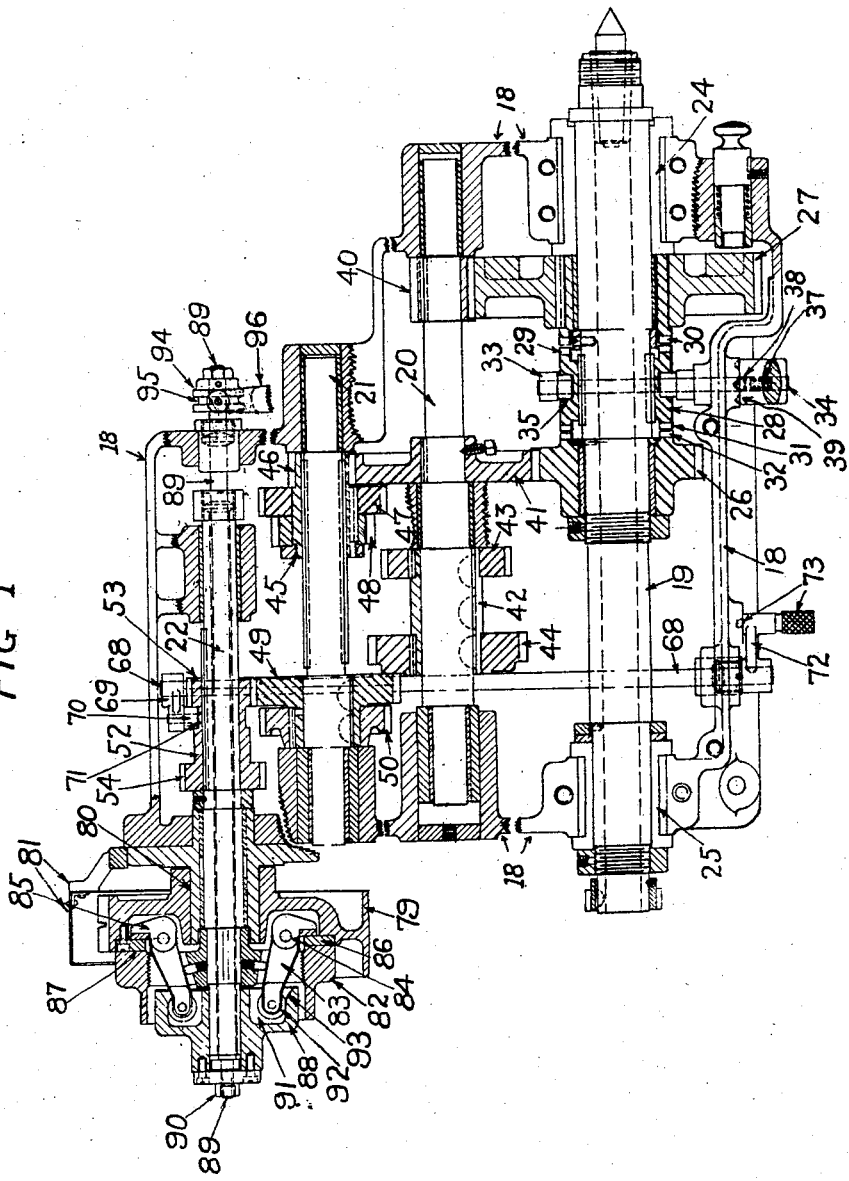

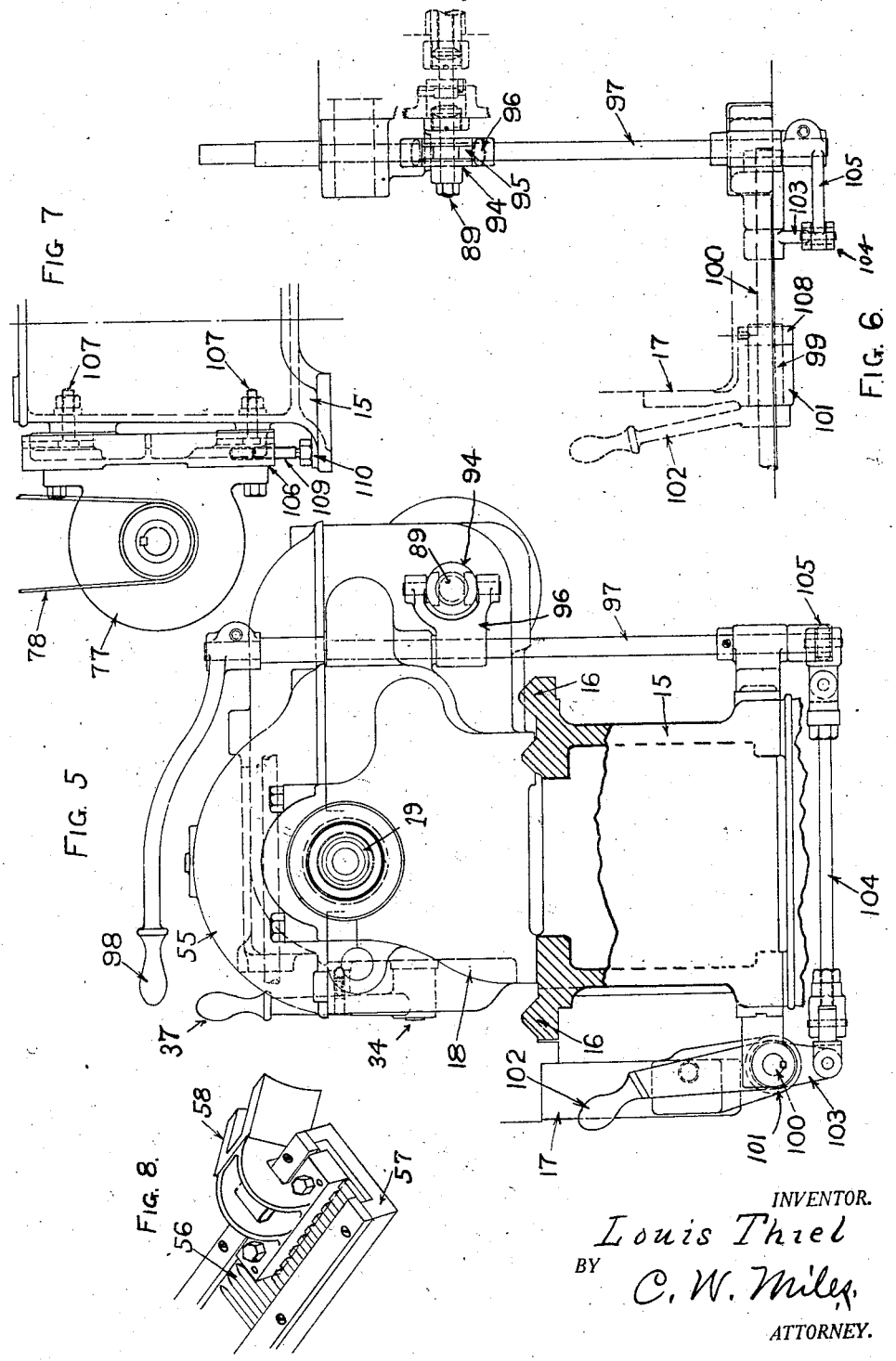

Patented Jan. 11, 1927.

1,614,049

UNITED STATES PATENT OFFICE.

LOUIS THIEL, OF CINCINNATI, OHIO, ASSIGNOR TO THE CINCINNATI LATHE AND TOOL COMPANY, A CORPORATION OF OHIO.

LATHE.

Application filed September 22, 1924. Serial No. 739,193.

My invention relates to improvements in lathes. One of its objects is to provide improved lathe headstock and spindle driving mechanism. Another object is to provide improved change speed lathe spindle driving mechanism. Another object is to provide improved means to effect the lathe spindle speed changes. Another object is to provide improved means operably from the headstock and from the tool carriage apron to start and stop the spindle drive. Another object is to provide improved spindle drive clutch and brake mechanism. My invention also comprises certain details of form and combination and arrangement of components, all of which will be fully set forth in the description of the accompanying drawings in which:

Fig. 1, is a substantially horizontal sectional view through a lathe headstock showing diagrammatically a lathe spindle and its change speed driving mechanism and embodying my improvements.

Fig. 2, is a plan view of the headstock cover.

Fig. 3, is a side elevation of the headstock and speed change controlling lever mechanism.

Fig. 4, is a front spindle end elevation of the headstock.

Fig. 5, is a vertical section through the lathe bed taken between the tool carriage apron and the tailstock and illustrating the apron control for the spindle drive.

Fig. 6, is a detail view of portions of the apron control mechanism for the spindle drive detached.

Fig. 7, is a sectional detail of the spindle driving motor base plate and its means of adjustment relative to the lathe bed plate to provide for adjusting the tension of the spindle driving belt or chain.

Fig. 8, is a perspective detail of a portion of the spindle speed changing mechanism detached.

The accompanying drawings illustrate the preferred embodiment of my invention, in which 15 represents the lathe bed, 16 the lathe ways, 17 the tool carriage apron, and 18 the headstock frame in or on which are mounted the lathe spindle 19 and successive speed changing spindle driving shafts 20, 21, and 22.

The lathe spindle 19 is preferably tubular and is journaled near opposite ends in bearings 24 and 25 in the headstock frame. Mounted loosely upon the spindle are two spur gears 26 and 27 of different diameters. Intermediate of the gears 26 and 27 is a clutch member 28 splined to move endwise of the spindle and provided at one end with clutch teeth 29 to engage clutch teeth 30 on the hub of the gear 27 and at its opposite end with clutch teeth 31 to engage clutch teeth 32 on the hub of the gear 26. The clutch member 28 is shifted along the spindle by means of a forked arm 33 mounted rigidly upon one end of a rock-shaft 34, and with its forked ends engaging in an annular groove 35 in the clutch member 28. A hand lever 37 is rigidly mounted outside of the headstock upon the rock shaft 34 and is provided with a spring actuated locking pin member 38. The locking pin member 38 engages any one of three recesses 39 to hold the clutch member 28 in engagement with the gear 26, to hold the clutch member 28 in engagement with the gear 27, or to hold the clutch member 28 in an intermediate position out of engagement with both gears 26 and 27.

The shaft 20 is mounted near opposite ends in bearings carried by the headstock frame 18. Mounted rigidly upon the shaft 20 is a pinion 40 which continuously meshes with the gear 27 on the lathe spindle. A spur gear 41 is also rigidly mounted on shaft 20 and continuously in mesh with the gear 26 on the lathe spindle to drive the lathe spindle from shaft 20 at a different speed ratio. A sleeve 42 is mounted rigidly upon the shaft 20. Rigidly mounted upon the sleeve 42 and spaced apart thereon are two spur gears 43 and 44 of relatively different diameters.

The shaft 21 is journaled near opposite ends thereof in bearings carried by the headstock frame 18. A sliding gear sleeve 45 is splined to the shaft 21 and is adjustable endwise thereon to a limited extent. Upon the sliding gear sleeve 45 are rigidly mounted a pinion 46, and two spur gears 47 and 48. At one position of the sleeve 45 the pinion 46 meshes with the gear 41 on shaft 20 to drive the shaft 20 at one speed ratio from shaft 21. At another position of the sleeve 45 the gear 47 meshes with the gear 43 on shaft 20 to drive the shaft 20 at a second speed ratio from shaft 21. At a third position of the sleeve 45 the gear 48 meshes with gear 44 to drive shaft 20 at a third speed ratio from the shaft 21. Rigidly mounted upon the shaft 21 are two gears 49 and 50 through which the shaft 21 is driven from the shaft 22.

The shaft 22 is preferably tubular in order to provide for actuating a starting and stopping clutch by means of a shifting rod extending through the bore of said shaft. Shaft 22 is journaled near opposite ends in bearings carried by the headstock frame 18. Splined upon the shaft 22 and having a limited movement endwise thereof is a sliding gear sleeve 52. Rigidly mounted upon the sleeve 52 and spaced apart thereon are two spur gears 53 and 54. In one position of the sleeve 52 the gear 53 meshes with gear 49 to drive the shaft 21 at one speed ratio and at a second position of the sleeve 52 the gear 54 meshes with gear 50 to drive shaft 21 at a second speed ratio.

The headstock frame 18 is preferably a hollow shell which serves as a receptacle for a limited quantity of lubricating oil in which some of the gears dip so as to automatically distribute lubricating oil to all the bearings and other parts within the headstock requiring lubrication. The relative positions of the spindle and shafts 20, 21, and 22 with reference to the headstock are shown in Fig. 4, and a headstock cover or cap 55 is detachably bolted to the top of the headstock frame 18. In order to shift the sleeve 45 endwise of the shaft 21, I provide a rack bar 56 which is mounted to slide endwise in guides 57 mounted rigidly within the headstock frame, said rack bar is provided with a forked bracket 58 which engages opposite side faces of the gear 47 to shift the sleeve 45 and gears 46, 47, and 48 endwise of the shaft 21. A rock shaft 59 is journaled to the headstock cover 55 and provided at one end with a gear segment 60 to engage said rack bar 56 to shift said rack bar and with it the gears 46, 47 and 48 endwise. A hand hole provided with a cover 61 is preferably provided through the headstock cover 55 over the segment 60 and rack bar 56 to afford convenient access thereto. The forward end of the shaft 59 projects through the front face of cover 55 and is provided with a crank arm 62 and locking pin 63 by means of which the crank arm 62 and shaft 59 may be locked by means of the pin 63 entering recesses 64, 65, and 66, to different positions relative to the headstock with the respective gears 46, 47 and 48 in operative or driving position.

The shaft 59, segment 60 and crank arm 62 are removable from the headstock with the cover 55. A hand hole cover 67 detachably supported upon the cover 55 provides means to replenish oil in the headstock 18. A rock shaft 68 is journaled relative to the headstock frame 18, transversely to the shaft 22 and is provided within the chamber of the headstock frame with a crank arm 69, the free end of which carries a shoe 70 which engages an annular recess 71 in the periphery of the sleeve 52, by means of which the sleeve 52 may be shifted endwise along the shaft 22. At the forward end of the shaft 68 outside of the headstock frame is a crank arm 72 and locking pin 73, by means of which the shaft 68 may be rocked by hand to adjust either gear 53 or gear 54 to operative position or both to an inoperative intermediate position, and to which positions the shaft 68 may be locked by the engagement of the locking pin 73 with one of the recesses 74, 75, and 76 in the front face of the headstock frame.

The shaft 22 is preferably driven at a uniform rate of speed by means of an electric motor 77, or if desired from a countershaft or other source of power through a belt or chain 78 passing over a pulley or sprocket wheel 79. The hub of wheel 79 is loosely journaled upon a sleeve 80 which is a part of a pulley housing 81, and also constitutes a journal bearing for one end of the shaft 22. The housing 81 and sleeve 80 are detachably mounted upon and relative to the headstock frame 18. A clutch member 82 is mounted rigidly upon the shaft 22 to rotate therewith at one side of the wheel 79. The clutch members 82 has a series of bell crank levers 83 pivotally attached thereto upon centers 84. The inner ends 85 of said bell crank levers serve to press an annular clutch ring or shoe 86 which is carried by and adjustable relative to the wheel 79 against the face 87 of the clutch member 82 to cause the clutch member 82 and shaft 22 to rotate with the wheel 79. A collar 88 is journaled upon the ends of shaft 22 and is movable endwise thereon through the endwise movement of the shifting rod 89 to one end of which said sleeve or collar 88 is attached by means of a clamping nut 90. The collar 88 has an annular flared recess 91 into which projects the outer ends of the bell crank levers 83. The outer ends of said bell crank levers are armed with rollers 92 which serve to ride upon the inclined annular face 93 of the collar 88 to simultaneously actuate the bell crank levers 83 to clutch the clutch member 82 to the wheel 79 when the collar 88 is shifted toward the wheel 79, and to release the clutch member 82 from wheel 79 when the collar is shifted away from the wheel 79. The rod 89 projects through the bore of the shaft 22, and at its opposite end is provided with a collar 94 mounted rigidly thereon and provided with an annular groove 95 which is engaged by the forked ends of a crank arm 96, which crank arm is mounted rigidly upon a vertically positioned rock shaft 97 journaled to the lathe bed at its lower end and journaled to the headstock frame near its upper end. A hand lever 98 is rigidly attached to the rock shaft 97 at its upper end by means of which the shaft 97 may be manually rocked by the operator when the operator is near the headstock to start and stop the spindle drive.

In order that the spindle drive may be controlled by the operator from the tool carriage apron 17 and at a considerable distance from the lever 98 I provide a shaft 100 extending practically the full length of the lathe ways along the front of the lathe bed and journaled thereto near opposite ends. Said shaft 100 is also provided with a bearing 101 attached to the apron 17 and through which bearing the shaft 100 moves endwise as the apron travels along the lathe bed. A hand lever 102 at one side of the apron 17 is splined to the shaft 100, and its hub forms a sleeve 99 which traverses the bearing 101 and is held therein against displacement by a collar or lock nut 108. The lever 102 is thus rotatably mounted with reference to the apron 17 and bearing 101, and travels therewith along the shaft 100, and at the same time is enabled to rock the shaft 100 when actuated from any position of the apron along the lathe bed. A crank arm 103 mounted rigidly upon the shaft 100 is pivotally connected by means of a link 104 with a crank arm 105 mounted rigidly upon the lower end of the rock shaft 97. Operation of the hand lever 102 therefore serves to rock the shaft 97 and start or stop the spindle feed.

In order to conveniently adjust the tension of the driving belt or chain 78 through which the driving pulley 79 is driven from the motor or countershaft I preferably provide a plate 106 which is adjustably mounted upon the rear of the cabinet leg or lower portion of the lathe bed plate below the headstock. The motor 77 is rigidly secured to the face of the plate 106 with its driving pulley in line with and below the pulley 79. The clamping bolts 107 by means of which the plate 106 is held to the bed plate being loosened a series of bolts 109 which are threaded into the lower edge of the plate 106, and which bolts 109 serve to support the weight of the plate 106 and the motor by reason of the heads of said bolts resting upon a ledge 110 forming parts of the cabinet leg of the bed plate 15, are successively adjusted to raise or lower the plate 106 and its motor 77 until the motor shaft is properly positioned with reference to the driven shafts, and the belt or chain is sufficiently tensioned to properly transmit power from the motor to the lathe spindle. The clamping bolts 107 are then tightened to rigidly clamp the plate 106 to the cabinet leg of the bed-plate until such time as the plate 106 requires readjustment. This arrangement provides for a ready, accurate, and convenient adjustment of the driving element with reference to the lathe spindle, and obviates vibration of the lathe bed and provides for an unusually compact assembly of the lathe and its driving element and also places the driving element where it is not liable to injury. The housing 81 carrying with it the pulley 79 and clutch 82 are readily detachable from the headstock.

The mechanism herein shown and described is capable of considerable modification within the scope of the claims without departing from the spirit of my invention.

What I claim is:

1. In a lathe a headstock frame, a lathe spindle journaled near opposite ends to said frame, a pair of gears mounted loosely upon said lathe spindle, a clutch member splined to said spindle and adjustable endwise to an intermediate idle position and to two active positions in which it serves to clutch said respective gears in driving relation to said spindle, a primary spindle driving shaft journaled to said headstock frame and provided with a pinion and a gear continuously in mesh respectively with the gears on the lathe spindle and also provided with a pair of gears rigidly mounted thereon through which said primary shaft is adapted to be driven, a second spindle driving shaft journaled to said headstock frame having two gears rigidly mounted thereon through which said second shaft is driven and an endwise adjustable sleeve on which are mounted three gears adapted to respectively mesh with and selectively drive through any one of three of the gears mounted upon said primary shaft, a third spindle driving shaft journaled to said headstock frame having a sleeve adjustable endwise thereon and provided with two gears adapted to respectively mesh with the gears rigidly mounted upon said second shaft to drive said second shaft from said third shaft.

2. In a lathe a chambered headstock frame, a lathe spindle journaled near opposite ends to said frame, a pair of gears mounted loosely upon said lathe spindle, a clutch member splined to said spindle and adjustable endwise to an intermediate idle position and two active positions in which it serves to clutch said respective gears in driving relation to said spindle, a primary spindle driving shaft journaled near opposite ends to said headstock frame and provided with a pinion and a gear continuously in mesh respectively with the gears on the lathe spindle and also provided with a pair of gears rigidly mounted thereon through which said primary shaft is adapted to be driven, a second shaft journaled near opposite ends to said headstock frame having two gears rigidly mounted thereon through which said second shaft is driven and an endwise adjustable sleeve on which are mounted three gears adapted to respectively mesh with and selectively drive through any one of three of the gears mounted upon said primary shaft, a third spindle driving shaft journaled near opposite ends to said headstock frame having a sleeve adjustable endwise thereon and provided with two gears adapted to respectively mesh with the gears rigidly mounted upon said second shaft to drive said second shaft from said third shaft, said headstock frame constituting a housing for said respective shafts and gears and serving as a reservoir to hold and automatically apply lubricant to said shafts and gears.

3. In a lathe a headstock frame, a lathe spindle journaled near opposite ends to said frame, a pair of gears mounted loosely upon said lathe spindle, a clutch member splined to said spindle and adjustable endwise to an intermediate idle position and to two active positions in which it serves to clutch said respective gears in driving relation to said spindle, a manually operable shifting member operable from the exterior of said headstock frame to shift said clutch member endwise of the lathe spindle, a primary spindle driving shaft journaled to said headstock frame and provided with a pinion and a gear continuously in mesh respectively with the gears on the lathe spindle and also provided with a pair of gears rigidly mounted thereon through which said primary shaft is adapted to be driven, a second spindle driving shaft journaled to said headstock frame having two gears rigidly mounted thereon through which said second shaft is driven and an endwise adjustable sleeve on which are mounted three gears adapted to respectively mesh with and selectively drive through any one of three of the gears mounted upon said primary shaft, a manually operable shifting member operable from the exterior of said headstock frame to shift the gear sleeve endwise of said second shaft, a third spindle driving shaft journaled to said headstock frame having a sleeve adjustable endwise thereon and provided with two gears adapted to respectively mesh with the gears rigidly mounted upon said second shaft to drive said second shaft from said third shaft, and a manually operable member operable from the exterior of said headstock frame to shift the gear sleeve endwise upon said third shaft.

4. In a lathe a chambered headstock frame, a lathe spindle journaled to said frame and provided with a plurality of gears loosely journaled upon said spindle, a clutch member splined upon said spindle and having an idle intermediate position and two active driving positions respectively in engagement with different gears to drive the lathe spindle at different speeds, a clutch shifting member mounted upon the headstock frame and operable from the exterior thereof to shift said clutch member from the exterior of the headstock and to indicate at the exterior of the headstock the position of said clutch member, a primary spindle driving shaft journaled to said headstock frame having rigidly mounted thereon a plurality of driving and driven gears two of which gears are continuously in mesh with gears on the lathe spindle, a second spindle driving shaft journaled to said headstock frame having thereon a plurality of driven gears, a driving gear sleeve splined upon and adjustable endwise upon said second shaft, a plurality of driving gears rigidly mounted upon said second shaft gear sleeve, said sleeve being adjustable upon said second shaft into an idle position and into three active positions in driving relation with gears upon said primary shaft, a shifting member to shift said second shaft gear sleeve mounted upon said headstock frame and operable from the exterior of said headstock frame and indicating from the exterior of said frame the position of said second shaft gear sleeve, a third shaft journaled to said headstock frame and projecting at one end from said headstock frame, a plurality of driving gears mounted upon said third shaft and adapted to drive said second shaft from said third shaft, a driven member mounted loosely upon said third shaft exteriorly of said headstock frame, and adapted to be driven at a uniform speed, a clutch member to clutch said driving member to said third shaft, and a manually operable shifting lever to actuate said third shaft clutch member.

5. In a lathe a headstock frame, a lathe spindle journaled to said headstock frame and provided with a plurality of gears loosely journaled upon said spindle, a clutch member splined upon said spindle and having an idle intermediate position and two active driving positions respectively in engagement with different gears to drive the lathe spindle at different speeds, a primary spindle driving shaft journaled to said headstock frame, a plurality of driving and driven gears two of which are continuously in mesh with gears on the lathe spindle rigidly mounted upon said primary shaft, a second shaft journaled to said headstock frame, a plurality of driven gears rigidly mounted upon said second shaft, a driving gear sleeve splined to said second shaft and adjustable endwise thereon to four different positions, a plurality of driving gears mounted rigidly upon said sleeve and adapted to be selectively engaged with three gears upon said primary shaft, a third tubular shaft journaled to said headstock shaft with one end thereof projecting exteriorly of said frame, a plurality of driving gears mounted upon said third shaft and adapted to be selectively engaged with gears upon said second shaft to drive said second shaft at relatively different speeds, a driven member mounted loosely upon said third shaft exteriorly of said headstock frame to drive said third shaft, a clutch member to clutch said driven member to said third shaft, a clutch shifting rod operable through the bore of said third shaft, and a manually operable lever to actuate said clutch shifting rod.

6. In a lathe a headstock frame, a lathe spindle journaled to said headstock frame and provided with a plurality of gears loosely journaled thereon, a clutch member splined upon said spindle and having an idle intermediate position and two active driving positions respectively in engagement with different gears to drive the lathe spindle at different speeds, primary second and third spindle driving shafts respectively journaled to said headstock frame and each provided with speed changing gears adapted to drive said lathe spindle from said third shaft at a variety of different rates of speed, a driven member loosely journaled upon said third shaft exteriorly of said headstock frame to drive said third shaft, a clutch member to clutch said driven member to said third shaft, a manually operable lever, and connecting mechanism connecting said lever with the clutch member on said third shaft to enable said clutch to be manually actuated through said manually operated lever.

7. In a lathe a headstock frame, a lathe spindle journaled to said headstock frame and provided with a plurality of gears loosely journaled thereon, a clutch member splined upon said spindle and having an idle intermediate position and two active driving positions respectively in engagement with different gears to drive the lathe spindle at different speeds, primary second and third spindle driving shafts respectively journaled to said headstock frame and each provided with speed changing gears adapted to drive said lathe spindle from said third shaft at a variety of different rates of speed, a belt driven member loosely journaled upon said third shaft to drive said third shaft, a clutch member to clutch said belt driven member to said third shaft, a manually operable lever stationarily mounted relative to said clutch, a second manually operable lever movably mounted relative to said clutch, and connecting mechanism connecting both of said manually operable levers with said third shaft clutch member to enable said clutch member to be selectively operated by either of said manually operable levers.

8. In a lathe a headstock frame, a lathe spindle journaled near opposite ends to said frame, a pair of gears mounted loosely upon said lathe spindle, a clutch member splined to said spindle and adjustable endwise to an intermediate idle position and to two active positions in which it serves to clutch said respective gears in driving relation to said spindle, a primary spindle driving shaft journaled to said headstock frame and provided with a pinion and a gear continuously in mesh respectively with the gears on the lathe spindle and also provided with a pair of gears rigidly mounted thereon through which said primary shaft is adapted to be driven, a second spindle driving shaft journaled to said headstock frame having two gears rigidly mounted thereon through which said second shaft is driven and an endwise adjustable sleeve on which are mounted three gears adapted to respectively mesh with and selectively drive through any one of three of the gears mounted upon said primary shaft, a third spindle driving shaft journaled to said headstock frame having a sleeve adjustable endwise thereon and provided with two gears adapted to respectively mesh with the gears rigidly mounted upon said second shaft to drive said second shaft from said third shaft, a belt driven member loosely journaled upon said third shaft to drive said third shaft, a clutch member to clutch said belt driven member to said third shaft, a manually operable lever stationarily mounted relative to said clutch, a second manually operable lever movably mounted relative to said clutch, and connecting mechanism connecting both of said manually operable levers with said third shaft clutch member to enable said clutch member to be selectively operated by either of said manually operable levers.

9. In a lathe a chambered headstock, a cover detachably mounted upon said frame, a lathe spindle journaled near opposite ends to said headstock frame, a primary shaft and a second shaft to drive said lathe spindle, speed changing gears mounted upon said spindle said primary shaft and said second shaft, a gear sleeve splined to and adjustable endwise relative to said second shaft, a plurality of gears mounted upon and adjustable with said gear sleeve, a rack-bar mounted to slide endwise in guides carried by said headstock frame and to shift said gear sleeve endwise of said second shaft, a rock-shaft journaled to said headstock cover, a gear segment mounted rigidly upon said rock shaft at one end thereof in position to mesh with and drive said rack-bar, a manually operable lever at the opposite end of said rock shaft and exteriorly of said headstock, and mechanism to lock said rock shaft to different positions of adjustment, and means to drive said second shaft.

In testimony whereof, I have hereunto affixed my signature.

LOUIS THIEL.